United States Patent [19]

Latos

[11] 4,329,734
[45] May 11, 1982

[54] FLASH LAMP ARRAY HAVING ELECTRICAL SHIELD

[75] Inventor: Edward L. Latos, Mentor, Ohio

[73] Assignee: General Electric Company, Schenectady, N.Y.

[21] Appl. No.: 115,926

[22] Filed: Jan. 28, 1980

[51] Int. Cl.³ .................. F21K 5/02; G03B 15/02; H05B 41/34
[52] U.S. Cl. ..................... 362/13; 362/15; 362/241; 362/247; 362/346; 431/358; 431/359; 431/365
[58] Field of Search ............ 362/15, 13, 11, 247, 362/249, 346, 241; 431/359, 358, 365

[56] References Cited

U.S. PATENT DOCUMENTS

| | | | |
|---|---|---|---|
| 4,019,043 | 4/1977 | Blount | 362/13 |
| 4,133,023 | 1/1979 | Hanson | 362/13 |
| 4,167,773 | 9/1979 | Hanson | 362/13 |
| 4,227,240 | 10/1980 | Shaffer et al. | 362/13 |
| 4,238,814 | 12/1980 | Bricker et al. | 362/13 |

Primary Examiner—Benjamin R. Padgett
Assistant Examiner—Irwin Gluck
Attorney, Agent, or Firm—John F. McDevitt; Lawrence R. Kempton; Philip L. Schlamp

[57] ABSTRACT

A photoflash lamp array comprising a housing elongated vertically and containing elongated flash lamps lying horizontally and stacked vertically, the flash lamps having lead-in wires extending from ends thereof near the sides of the housing and connected to a circuit board located behind the lamps. A conductive sheet-like shield is positioned between the circuit board in the rear of the housing and is contoured to have side portions extending forwardly in between lamp ends and the sides of the housing. The front surface of the shield is both electrically conductive and reflects light with electrically insulated flash indicator material being positioned on said front surface but not extending to the side portions thereof. By increasing the light reflective surface of said shield member in this manner there is increased light output obtained from said lamp array.

7 Claims, 1 Drawing Figure

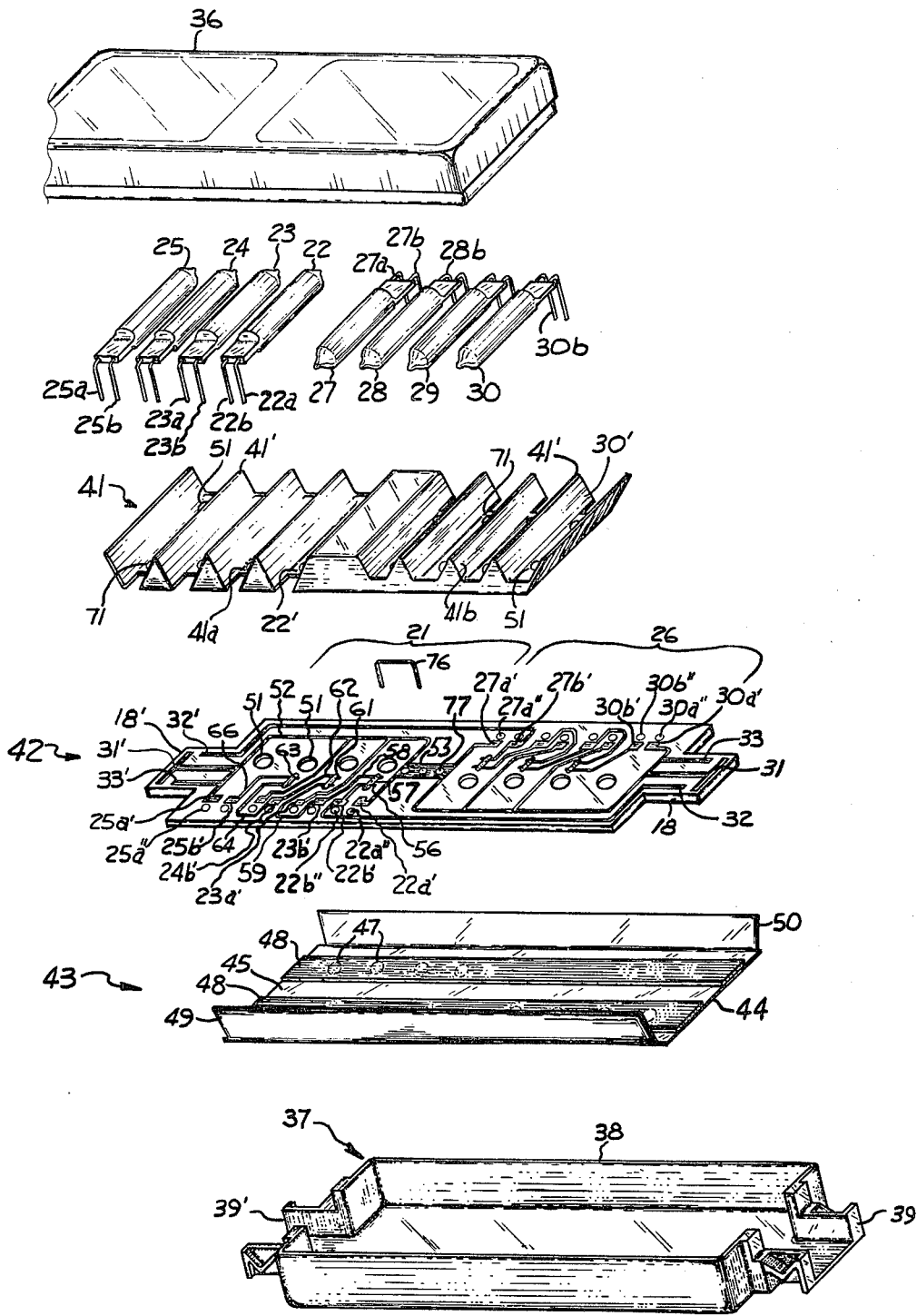

FLASH LAMP ARRAY HAVING ELECTRICAL SHIELD

BACKGROUND OF THE INVENTION

This invention is in the field of multiple photoflash lamp units such as the FlipFlash type of flash array.

U.S. Pat. No. 4,019,043 to Blount discloses a FlipFlash type of array having a metal foil shield positioned between the circuit board and connected to electrical ground of the circuit. The metal foil is in the form of a metal coating on a paper indicia sheet which also is provided with flash indicator means to indicate which of the lamps have been flashed. In U.S. Pat. No. 4,133,023 to Hanson there is also disclosed a FlipFlash type of array having said shield member wherein the electrically insulative flash indicator material extends entirely up the sides of said conducting surface in order to prevent the lamp lead-in wires from becoming shorted against the shield. The still more recently issued U.S. Pat. No. 4,167,773 to Hanson also discloses such shield member for a FlipFlash type of array wherein said electrically insulated flash indicator material positioned on the front conductive surface extends only partially up the sides of said conductive surface.

SUMMARY OF THE INVENTION

In connection with the photoflash lamp array described in the aforementioned U.S. Pat. No. 4,133,023, it has been found that a modification of the sheet-like electrical shield member as described therein provides an effective means to increase the light output from said photoflash array without encountering other operational problems. More particularly, the present improvement consists of a structural modification for said sheet-like member wherein the electrically insulative strips disposed on one major surface of the sheet member over a conductive surface which reflects light do not extend to the pair of side portions extending upwardly or outwardly from said major surface to flank both ends of the flash lamps as disposed in the assembled planar array. The present improvement thereby comprises a multiple flash lamp array comprising a vertically elongated circuit board having circuitry for sequentially firing flash lamps and a plurality of elongated flash lamps of the electrically fired type positioned over the front of said circuit board in a line horizontally and stacked vertically and having lead-in wires at the side ends thereof connected electrically to said circuitry, and an electrically conductive shield in the form of a conductive sheet member having a light reflective surface positioned behind and substantially parallel to said circuit board, said shield being provided with side portions extending frontwardly of said circuit board and substantially flanking said flash lamps, wherein the improvement comprises providing said shield in the form of a composite sheet member having a non-conductive major face and a conductive major face which reflects light, said conductive major face having at least one strip of radiation-sensitive non-conductive plastic material disposed over apertures in said composite sheet member to indicate when the associated flash lamps have been flashed as well as provide electrical insulation between the terminals of said flash lamps, and with said conductive major face further having a pair of raised opposing sides which is devoid of said plastic material and which extend upwardly to house such flash lamps therebetween and thereby serve to increase the amount of light being emitted from the flash lamp array. The amount of light gain achieved in this manner is modest but significant and light gains from one percent to more than 1.5 percent have been experienced which are attributable to such modification of the existing FlipFlash array units. Accordingly, it should only be further necessary in providing the following detailed description of the present improvement to describe the structural modification made since in all other respects this photoflash array unit and its operation is already adequately described in the aforementioned U.S. Pat. No. 4,133,023.

BRIEF DESCRIPTION OF THE DRAWING

The accompanying drawing is an exploded perspective view of the flash array incorporating the improved electrical shield member of the present invention.

DESCRIPTION OF THE PREFERRED EMBODIMENTS

The general construction of the flash lamp array comprises front and back housing members 36 and 37, which preferably are made of plastic. In the preferred embodiment shown, the front and back housing members are joined together at their sides as indicated at the seam line 38, and the back housing member 37 includes integral extensions 39 and 39' at the ends thereof which partly surround and protect the connector tabs 18 and 18' and also function and facilitate mechanical attachments to the camera socket. Sandwiched between the front and back of the housing members 36 and 37, in the order named, are the flash lamps 22, etc., a unitary reflector and barrier member 41 (preferably a white plastic) shaped to provide the individual reflectors 22', etc., and barriers 41' between adjacent lamps to prevent sympathetic flashing of the lamp when an adjacent lamp is flashed. A printed circuit board 42 provided with integral connector tabs 18 and 18', and a combined shield and indicia sheet 43 having the modified construction of the present invention, which may be provided with instructions, information, and other indicia such as flash indicators 47 located behind the respective lamps and which change color due to heat and/or light radiation from flashing lamps, thus indicating at a glance which of the lamps have been flashed and not flashed.

The improved electrical shield member 43 may be of paper or thin cardboard 44 coated with a layer of metal 45 such as aluminum on its major inner surface, and provided with openings where the flash indicators 47 are desired and flash indicator material 48 such as a sheet-like heat sensitive plastic material, for example by axially oriented polypropylene which shrinks or melts when subjected to heat or radiant energy from an adjacent flashing lamp is positioned in strips over the openings for the flash indicators 47 thus effective changing the color at these openings when the adjacent lamps are flashed. For example, the plastic material can be colored green on its back side by ink or other suitable means, and the green disappears when the opening becomes a different color (dark for example) when the plastic shrinks or melts away due to heat from the adjacent flashing lamp. The front of the plastic (toward the lamps) should be coated with dark ink so as to absorb heat more readily. One or more flash indicator sheets or strips 48 may be arranged over portions of the metal coating 45 to cover over all of the flash indicator openings. Window means 51 in the form of openings or transparent areas are provided to the reflector and barrier unit 41 and circuit board 42 to facilitate radiation from flashing lamps reaching the flash indicators 47. The metal coating 45 functions as a shield and extends onto forwardly bent side portions 49 and 50 of the electrical shield sheet member 43. The rear housing member 37 is transparent (either of clear material are provided with window openings) to permit viewing of the indicia on the sheet member 43. The front housing member 36 is transparent at least in front of the lamps 22, etc. to permit light from flashing lamps to emerge frontly of the array, and may be tinted to alter the color of light from the flash lamps and also may be provided with lenses or prisms for controlling the light distribution pattern.

The height and width of the rectangular array are substantially greater in thickness, and the heights and widths of the reflector and barrier member 41 and circuit board 42 are substantially the same as the interior height and width of the housing members, to facilitate holding the parts in place. The reflector and barrier member 41 is a one-piece member, preferably of molded white plastic interspersed with titanium dioxide, shaped to provide the reflectors 22' etc. in the form of planar rear portions 41a, etc. behind the respective lamps, and the tapered reflector sides 41b, etc. between the adjacent lamps which also form the barriers 41' for preventing sympathetic flashing by which a lamp adjacent to a flashing lamp could be caused to flash due to heat and/or light radiation from the flashing lamp.

The tab 18 which is integral with the circuit board 42 is provided with a pair of electrical terminals 31 and 32, and similarly the tab 18' is provided with a pair of terminals 31' and 32', for contacting terminals of a camera socket for applying firing voltage pulses to the array. Terminals 31 and 31' are connected together to a lead-in wire of each lamp, and consititutes part of the electrical ground circuit of the array. Each tab is provided with a third terminal 33 and 33' respectively, which is connected respectively to terminals 31 and 31'. Alternatively, these third terminals can be connected to the opposite group of lamps and circuits as disclosed in U.S. Pat. No. 3,952,320 to Blount. The terminals 31 and 31' are shown as having a lateral "T" configuration for temporarily shorting the socket terminals while the array is being plugged in, to discharge a residual voltage charge in the firing pulse source and also to reduce the chance of the lamp being accidentally flashed by electrostatic voltage when the array is handled, as disclosed in U.S. Pat. No. 3,980,876 to Cote.

The circuit board 42 has a "printed circuit" thereon as will now be described for causing sequential flashing to the lamps by firing voltage pulses applied to the terminals 31, 32 or 31', 32'. The top and bottom halves of the printed circuitry preferably are reverse mirror images of each other. In the preferred embodiment shown, a pair of printed circuit pads 22a' and 22b' are provided on the circuit board, to which the lead-in wires 22a and 22b of lamp 22 are to be connected. Similarly, circuit pads 23a' and 23b' through 25a' and 25b', and 27a' and 27b' through 30a' and 30b' are provided for connection to the lead-in wires of the remaining lamps. The numbers and the letters in the circuit pad designation is corresponding to those of the lead-in wires. The circuit pads for the group 21 of lamps are aligned in a row near one edge of the circuit board, and the circuit pads for the other group 26 of lamps are aligned in a row near outer edge of the circuit board on the opposite half of the board. The respective lead-in wires 22a, 22b, etc. of the lamps may be attached to connector pads 22a', 22b', etc. in various ways, such as being ultrasonically driven into the circuit board and against the appropriate connector pad as disclosed in U.S. Pat. No. 4,028,798 to Bechard et al. In this technique, openings 22a" and 22b", etc. are provided through the circuit board through or adjacent to the connector pads 22a' and 22b' etc. The lead-in wires 22a and 22b etc. of the flash lamps are placed through the respective openings 22a" and 22b", etc. from the front of the circuit board, are laid on the back of the circuit board, and are driven by ultrasonic drivers into the board to make electrical or mechanical contact with the respective circuit pads 22a' and 22b' etc. As shown, the flash lamp lead-in wires emerge from each elongated bulb and an end thereof with the lamps positioned horizontally and stacked vertically their lead-in wires are near a side of the array and are further bent for connection to the respective adjacent circuit pads. All of the "a'" circuit pads are connected electrically together and to the common electrical ground connector terminals 31 and 31' by a circuit run 52 which includes a ground pad area 53 at the center of the circuit board. The "electrically hot" connector terminal 32 is connected via a circuit run 54 to the circuit pad 22b' and to a radiation switch terminal 56. A radiation activated switch 57 is connected across and between the switch terminal 56 and a switch terminal 58 which connects to the next "hot" lamp circuit pad 23b'. Similarly, a switch terminal 59 is connected to the lamp pad 23b', and a radiation-activated switch 61 is connected across between the terminal 59 and a switch terminal 62 which is connected to the lamp pad 24b'. A third radiation-activated switch 63 is connected across and between a circuit run terminal 64 connected to pad 24b' and a circuit run terminal 66 connected to the lamp pad 25b'. The radiation-activated switches 57, 61 and 63 are respectfully located behind the lamps 22, 23 and 24, and initially have a high impedance such as several thousand ohms or over a million ohms. Window means 71 such as transparent sections or openings to the back of the reflector barrier unit 41 permit light and heat radiation from the flash lamps when flashed to reach the radiation switches and convert them to 0 or low impedance such as a few hundred ohms so as to connect the "hot" connector terminal 32 to the next lamp to be flashed. A suitable material for the radiation switches is silver oxide dispersed in a binder such as polyvinyl resin. Each of these radiation switches, upon receiving heat and/or light radiation from the adjacent lamp when it is flashed, changes from an open circuit of high resistance to a closed circuit or low resistance between its switch terminals on the circuit board.

As has been explained, the lower portion of the circuit board contains a substantially reverse mirror image of the same circuit board shown on the upper part of the circuit board, and therefore will not be described in detail. It will be noted that the circuit runs from the plugged-in terminals 31 and 32 at the lower part of the circuit board extend upwardly so as to activate the circuit in the upper half of the circuit board. Similarly, when a unit is turned around and tab 18' is plugged into a socket, the circuit board terminals 31' and 32' will be connected to and activate the lamps which then will be in the upper half of the circuit board, and hence in the upper half of the flash unit. This accomplishes, as has been stated, the desirable characteristic whereby only the lamp farthest away from the lens axis will be flashed, thereby reducing or eliminating the undesirable red-eye effect. For convenience in laying out the circuit board runs, the pads 22a' and 22b' of lamp group 21, and pads 27a' and pads 27b' of lamp group 26 are relatively reversed with respect to the other pads in the respective groups. A wire staple 76 is placed through openings 77 through the circuit board at the electrical ground pad 53 and its projections at the rear of the board are curved along the rear surface of the board and contact the conductive coating 45 of the electrical shield member 43, thus electrically connecting the shield 45 to the electrical ground of the circuit.

As can be noted from said drawing, the conductive major surface 45 of said composite electrical shield member 43 further includes a pair of raised opposing sides 49 and 50 which are devoid of the plastic flash indicator material 48. Both sides 49 and 50 had previously been electrically insulated with said plastic material by reason of the close physical proximity of lamp in-leads and the circuit board pattern to said otherwise conductive surfaces. It has now been found, surprisingly, that a sufficient physical spacing can be maintained between said components to avoid developing such short circuit condition in spite of the relatively high operating and electrostatic voltages involved. Understandably, such exposure of the conductor surface which reflects light at a location extending frontwardly of said circuit board to flank said flash lamps serves as an effective means to increase the amount of light being emitted from the flash lamp array.

While preferred embodiments of the invention have been shown and described, various other embodiments, modifications, thereof will become apparent to persons skilled in the art and thereby fall within the scope of the invention as defined in the following claims.

What I claim as new and desire to secure by United States Letters Patent is:

1. A multiple flash lamp array comprising a vertically elongated circuit board having circuitry for sequentially firing flash lamps and a plurality of elongated flash lamps of the electrically fired type positioned over the front of said circuit board and lying horizontally and stacked vertically and having lead-in wires at the side ends thereof connected electrically to said circuitry, and an electrically conductive shield in the form of a conductive sheet member positioned behind and substantially parallel to said circuit board, said shield being provided with side portions extending forwardly of the circuit board and substantially flanking said flash lamps wherein the improvement comprises electrically insulative flash indicator material on the inside surface which does not extend to said side portions as a means to increase the amount of light being emitted from the flash lamp array while also maintaining sufficient physical spacing between said circuitry and the side portions of said conductive sheet to avoid short circuiting therebetween.

2. An array as in claim 1 wherein said shield is in the form of a composite sheet member having a non-conductive major face and a conductive major face which reflects light, said conductive major face having at least one strip of said flash indicator material deposited thereon.

3. An array as in claim 1 wherein said shield is a sheet of paper having a metal layer on the inside surface thereof.

4. An array as in claim 1 including a plastic reflector unit positioned behind said lamp and in front of said circuit board.

5. An array as in claim 1 wherein the circuitry includes an electrical ground, and means connecting said shield to said electrical ground.

6. An array as in claim 5 in which a lead-in wire of each of said lamps is connected to said electrical ground.

7. A multiple flash lamp array comprising a vertically elongated circuit board having circuitry for sequentially firing flash lamps and a plurality of elongated flash lamps of the electrically fired type positioned over the front of said circuit board and lying horizontally and stacked vertically and having lead-in wires at the side ends thereof connected electrically to said circuitry, a plastic reflector unit positioned behind said lamps and in front of said circuit board, and an electrically conductive shield in the form of a conductive sheet member positioned behind and substantially parallel to said circuit board, said shield being provided with side portions extending forwardly of the circuit board and substantially flanking said flash lamps, wherein the improvement comprises providing said shield in the form of a composite sheet member having a non-conductive major face and a conductive major face which reflects light, said conductive major face having at least one strip of electrically insulative flash indicator material on the inside surface which does not extend to said side portions as a means to increase the amount of light being emitted from the flash lamp array while also maintaining sufficient physical spacing between said circuitry and the side portions of said conductive sheet member to avoid short circuiting therebetween.

* * * * *